United States Patent
Hotchkiss et al.

(10) Patent No.: US 7,417,841 B2
(45) Date of Patent: Aug. 26, 2008

(54) APPARATUS AND METHOD FOR FUSING VOLTAGE SURGE AND TRANSIENT ANOMALIES IN A SURGE SUPPRESSION DEVICE

(75) Inventors: Ronald Hotchkiss, Destin, FL (US); Richard Hotchkiss, Destin, FL (US)

(73) Assignee: Surge Suppression, Inc., Destin, FL (US)

( * ) Notice: Subject to any disclaimer, the term of this patent is extended or adjusted under 35 U.S.C. 154(b) by 385 days.

(21) Appl. No.: 11/003,828

(22) Filed: Dec. 3, 2004

(65) Prior Publication Data

US 2005/0122655 A1  Jun. 9, 2005

Related U.S. Application Data

(60) Provisional application No. 60/526,875, filed on Dec. 4, 2003.

(51) Int. Cl.
*H02H 5/04* (2006.01)
*H02H 3/22* (2006.01)

(52) U.S. Cl. .................... 361/103; 104/104; 104/93.8; 104/117

(58) Field of Classification Search ................ 361/103, 361/117, 93.8, 104
See application file for complete search history.

(56) References Cited

U.S. PATENT DOCUMENTS 4,795,380 A * 1/1989 Frantz ........................ 439/860
4,962,363 A * 10/1990 Sexton, Jr. .................. 337/186
5,124,876 A * 6/1992 Misencik et al. ............ 361/117
5,488,534 A    1/1996 Rau et al.
5,519,586 A    5/1996 Byrd
5,781,394 A * 7/1998 Lorenz et al. ............... 361/124
5,808,850 A    9/1998 Carpenter, Jr.
6,040,971 A    3/2000 Martenson et al.
6,122,157 A    9/2000 Gerlach
6,354,890 B2 * 3/2002 Adkins et al. ............... 439/843
6,430,017 B1 * 8/2002 Finlay et al. ................ 361/104
6,498,708 B2   12/2002 Schilloff et al.
6,501,634 B1   12/2002 Hubbell
6,636,409 B2   10/2003 Kladar et al.
2001/0022716 A1  9/2001 Glaser et al.
2002/0098718 A1 * 7/2002 Harmon et al. ............... 439/35
2005/0181682 A1 * 8/2005 Stepp et al. ................. 439/860

* cited by examiner

*Primary Examiner*—Michael J Sherry
*Assistant Examiner*—Zeev Kitov
(74) *Attorney, Agent, or Firm*—Larson & Larson, PA; James E. Larson

(57) ABSTRACT

A circuit board is enclosed in a housing containing rows of metal oxide varistors. Multiple surge ferrule type fuses are soldered directly to circuit board holes between the rows of metal oxide varistors. A ring connector electrically connects pairs of fuses and an electrical conductor connects the ring connector to an electrical circuit to be protected.

16 Claims, 5 Drawing Sheets

APPARATUS AND METHOD FOR FUSING VOLTAGE SURGE AND TRANSIENT ANOMALIES IN A SURGE SUPPRESSION DEVICE

This application claims the benefit of U.S. Provisional Application No. 60/526,875 filing date Dec. 4, 2003.

BACKGROUND OF THE INVENTION

1. Field of the Invention

The present invention relates to an apparatus and method for fusing surge protective device components on a printed circuit board designed to respond to and mitigate transient electrical anomalies and abnormal conditions to which the surge protective device may be subjected. More particularly, it relates to an apparatus and method for fusing surge protective device components thus protecting the circuit from both thermal and line level over-current conditions that can result in unacceptable end of life conditions for the transient voltage surge suppressor or surge protective device.

2. Description of the Prior Art

Transient Voltage Surge Suppression (TVSS) devices, also known as Surge Protective Devices (SPD), are well known in the prior art. TVSS devices are used with computers, other types of electrical equipment and electrical circuits to protect against electrical line voltage surges and other occurring transient electrical anomalies that may occur along an electrical power line to which the equipment or circuit is coupled. Transient over voltages or voltage surges result in peak voltage levels that occur within an electrical line that are higher than that which the equipment being protected is rated to handle (i.e., over-voltages). Transient electrical anomalies include other types of electrical occurrences in the electrical line that are considered sub-cycle events which cause the equipment to operate improperly or completely fail (i.e., over-currents and the like). Transient over voltages or voltage surges have become even more problematic in today's sophisticated electrical world wherein sensitive computerized equipment requires a constant and regulated supply voltage.

Various types of voltage surges that can effect an electrical device or circuit can occur at any given time within an electrical line, and include Temporary Over Voltages, and abnormal conditions such as Full-Phase Over voltages and Limited Current Over voltages. It is desirable to suppress any excess voltage or current that occurs on an electrical circuit that has been disturbed. Studies by the Institute of Electrical and Electronics Engineers (IEEE) have shown 120 Volt power lines reaching as high as 5,600 Volts. Suppression of these over-voltages and other transient electrical anomalies is highly desirable, and many instances critical, to the operation of an electrical device, computer or electrical circuit.

Transient over voltages and voltage surges can occur due to a plurality of factors, to include, but are not limited to, internal anomalies and external anomalies such as, lightning strikes, circuit overloads, power company grid activity, temporary or permanent failure of the neutral conductor, recovery from brown-outs, black-outs and circuit interruption by simple human error. Since transient over voltages and voltage surges are very common, but difficult to predict, it is imperative to have a TVSS device on line at all times protecting the targeted piece of electrical equipment or circuit. To leave the equipment unprotected can result in a devastating consequence wherein the equipment is temporarily brought off-line, severely damaged or completely destroyed. This result could be detrimental to hospitals, police, fire and rescue units, the military and other critical functioning entities who can not afford to be "off-line" for any period of time. It is therefore critical to suppress these surges and anomalies and minimize their effect on the electrical equipment they are charged to protect.

It is understandable however, that even the best, most complex, most redundant TVSS devices are not one hundred percent effective against all electrical line surges and transient anomalies. However, suppressing as many of these surges and transients as possible will most likely result in a longer life to the electrical equipment that the TVSS device is protecting and also help to minimize any possible "down-time".

Many TVSS devices, and in particular solid state devices, employ metal oxide varistors (MOVs) to provide for a non-linear voltage-current relationship for handling the surge suppression. However, other TVSS devices exist which employ silicon avalanche diodes (SADs), zener diodes, selenium cells and high voltage capacitors for surge suppression. In other TVSS devices, gas discharge tubes are employed for the surge suppression component. MOV designed TVSS devices are favored over many other surge suppression components due to their ability to be used in low voltage applications, such as, for example, AC power distribution systems having a normal and nominal operating voltage less than or about 600 volts AC (600 VAC).

MOVs act as a type of current diverter for the TVSS device. Under normal conditions, TVSS device surge suppression components, such as MOVs, draw very little current. As the voltage level increases across the TVSS device, to a level higher than the system voltage and that which the equipment it is protecting is designed (rated) to handle, the impedence of the TVSS circuit drops significantly, effectively causing electrical conduction across the surge suppression components or MOVs. Since very low impedance is required in voltage surge suppression, this result is highly desirable. The result of this current diverting scheme is voltage surge absorption by the MOVs. The energy absorbed by the surge suppression components, such as the MOVs, is dissipated as heat. In some instances (a sustained over voltage condition), the heat rises to a level which causes the MOV, or other surge suppression component, to burn, melt or explode. Although the desired result of voltage surge suppression may have been realized, the melting, burning or explosion of the MOV can cause other problems that must be addressed. For instance, the MOV can vaporize which can result in plasma being formed which in turns creates a new electrical conductor. This new electrical conduction defeats the purpose of the TVSS device resulting in damage to the equipment that the TVSS device is meant to protect by letting through the voltage surge or transient which the TVSS was intended to suppress. Further, unacceptable end of life conditions can cause damage to the equipment that the TVSS was intended to protect as well as surrounding equipment near the installation site of the TVSS. For these reasons, it is imperative to provide a mechanism for the TVSS device which would permit it to operate up to a level which provides for adequate transient voltage surge suppression all the while providing for the ability to be brought off line to avoid TVSS device failure or environmental hazards in cases where the surge protective device components are reaching their end of life. In other words, it is desirable to provide a manner in which the TVSS device can safely fail; otherwise known as an "acceptable failure mode" or "acceptable end of life conditions".

To avoid the problems associated with surge suppression component (i.e., MOV) destruction which can cause TVSS device failure, advancements have been made to TVSS devices, including but not limited to, device container improvements to quell or contain plasma formation and the provision of fusing circuitry to prohibit MOV burn-up. U.S. Pat. No. 5,488,534 to Rau et al. addresses both of these issues. To inhibit plasma formation, a plastic cover and housing are used for the TVSS module, silver wires serve as fuses or fuse links since they are known to have a lower oxidation energy level than copper or aluminum, and longer lengths are used for the fuse wires which raises voltage re-strike levels thereby reducing arc formation that may occur in a wire melt down situation. In this prior art device, one wire fuse is used for every MOV that is employed. Although this may be appropriate when employing small thermal fuses for each MOV, this would be more difficult if using larger current rated fuses. If so, the use of one current rated fuse for every MOV would require that a larger housing be employed. For those circuits that require a significant level of transient voltage surge suppression, the size of such a device would not be acceptable for most applications with today's modern need for limited space requirements. Further, even if the TVSS device could be made to be compact due to a minimal amount of surge suppression components being employed, and therefore a minimal number of fuses being employed, space requirements within the environment where the device is employed could still dictate that the device of this prior art reference is too large (i.e., the confined spacing requirements of a naval vessel). Still further, the use of a current rated fuse for every MOV would most likely cause the TVSS device to constantly go off-line due to the fast acting response time of standard current rated fuses. This of course would defeat the entire purpose of the TVSS device. On the other hand, if only thermal fuses are employed, then the problems associated with a non-performing TVSS device that has reached its end of life due to high current abnormal over voltage conditions will still exist since the thermal fuses only work at the component level to take overheated MOV components off-line. Simply put, the use of thermal fuses only at the component level is inadequate for today's needs in transient voltage surge suppression technology.

For these reasons, an improved TVSS device is clearly needed wherein an adequate but minimal amount of fusing is employed in a compact space such that unnecessary components and additional printed circuit boards are not employed. The improved device should maintain very fast response time and not sacrifice transient response for space since many transients occur immediately after one another in a very short period of time (typically 1-10 nanoseconds). The use of current rated fuses in combination with the MOVs and thermal fuses, all conveniently located within the same housing would be a vast improvement over the prior art. However, the use of current rated fuses should not inhibit the TVSS device from doing its intended job of suppressing transients by taking the TVSS device off-line too quickly.

SUMMARY OF THE INVENTION

We have invented an improved TVSS device with advanced fusing circuitry that overcomes the deficiencies in the prior art. Our TVSS device employs surge rated fuses in combination with a plurality of MOVs having thermal rated fuses in close proximity thereto. Each MOV has its own thermal fuse associated with it in the circuit. This ensures that if a particular MOV rises to a temperature level that would normally cause the MOV to burn, melt or explode, due to excessive over voltage or over current events that the thermal fuse will respond by opening and taking the MOV out of the circuit (off-line). This addresses the lower current abnormal over voltage catastrophic failure scenario.

The surge rated fuses of our improved TVSS device ensure that the TVSS device can accomplish its intended job of protecting the equipment it is coupled to, by handling specific amounts of peak current surge thereby ensuring that the MOV components will not burn so quickly that a catastrophic failure could occur. Our improved TVSS device, with advanced surge rated fusing circuitry, also addresses the issue of limited space requirements all the while meeting the needs of the end user and thereby allowing for efficient manufacturing and component operation.

Our surge rated fuses are coupled to the circuit in very close proximity to the MOVs on the same printed circuit board. No fuse holders are employed. Instead, ferrule type fuses are employed by soldering them directly to the printed circuit board without the need for a secondary connector or specialized fuse holder or fuse clip and also directly to the power conductors via a terminal and solder connection. No specialized solder tabs or clips are needed with our employed surge rated fuses of the present invention. This is a result of our unique printed circuit board design which allows for the direct insertion of the ferrule type fuse at the board level. This reduces lead length (signal distance) to the unit which equates to a lesser impedance. The smaller package size gained from locating the surge rated fuses on the same printed circuit board as the MOVs within a single housing reduces overall lead lengths and lesser impedance within the whole power system to which the device is coupled. Further, the shorter lead lengths and the close proximity of both the thermal and surge rated fuses allows for quicker response time for both types of fuses which in turn improves the overall protection abilities of the TVSS device against catastrophic failure modes or end of life conditions. This all equates to an acceptable failure mode for the TVSS device wherein the TVSS device can suppress the voltage surges and transients that it is rated to handle, and be able to go off-line in those events that would normally cause catastrophic failure.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
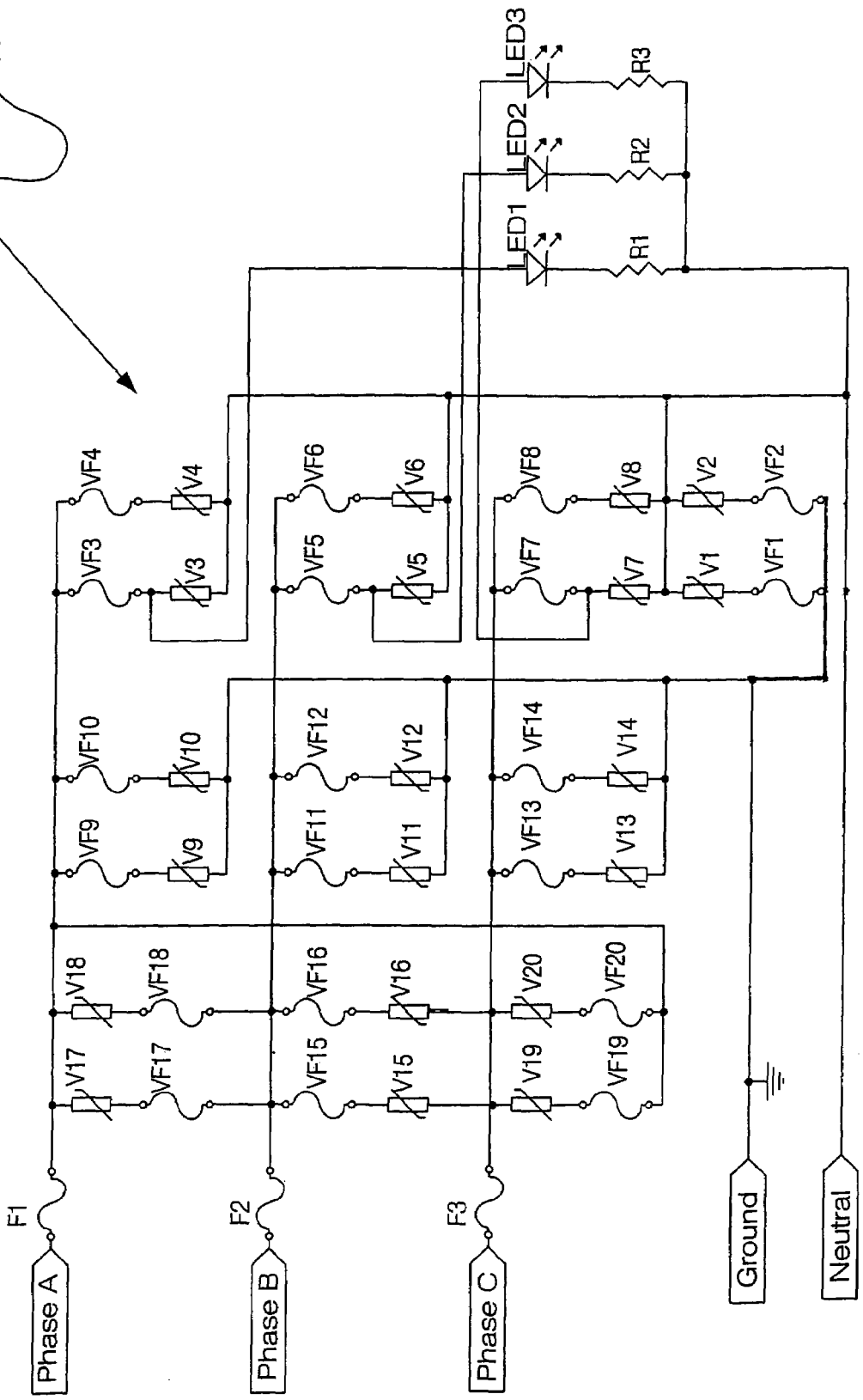
FIG. 1 is an electrical schematic diagram of a novel circuit used in the TVSS device of the present invention.

Throughout the following detailed description, the same reference numerals refer to the same elements in all figures.

Figure 2:
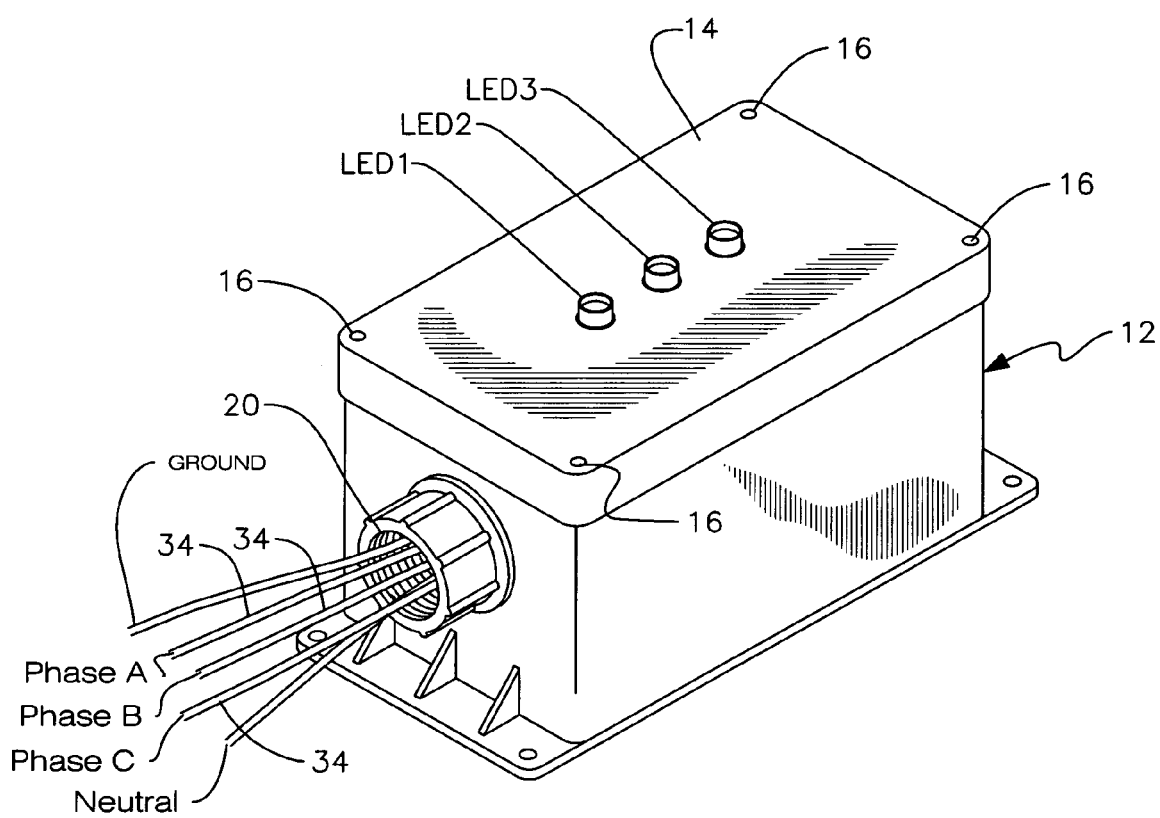
FIG. 2 is a perspective view of a housing enclosing the novel TVSS device circuit of the present invention.
Figure 3:
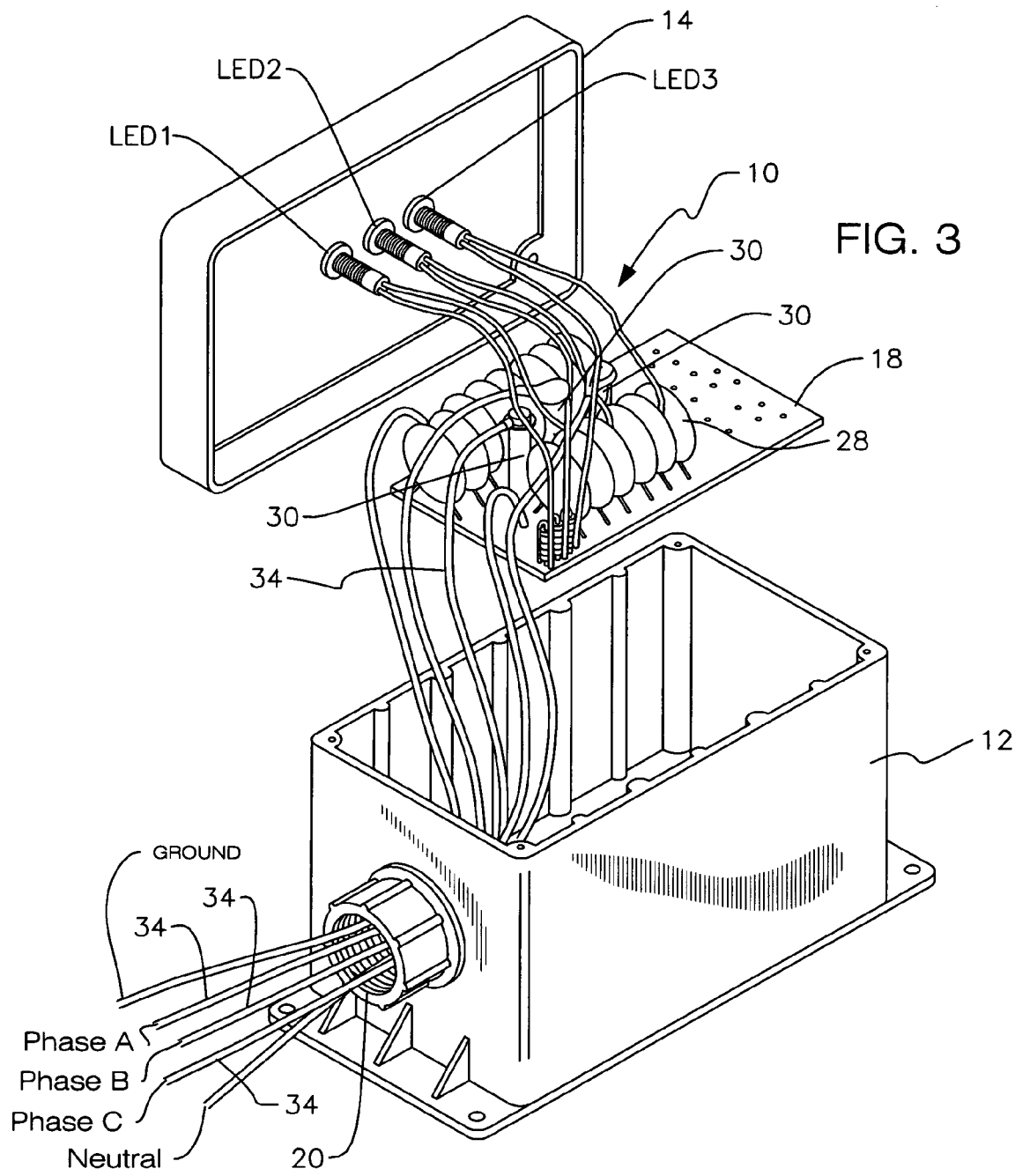
FIG. 3 is an exploded view of the housing enclosing the novel TVSS device circuit employing three fuses.

Referring to FIG. 1, an electrical schematic diagram is shown illustrating a fused transient surge suppression circuit 10 employed with a transient voltage surge suppression device of the present invention. As shown, circuit 10 employs a plurality of Metal Oxide Varistors (MOVs) V1-V20 arranged in three columns (one for each phase of a three phase line) but electrically coupled in parallel. It is understood that nothing herein limits the use of this novel circuit with either single or two phase lines. It is further understood that any number of MOVs or like surge suppression components can be employed per column. Also, the number of columns can vary dependent upon the modes of protection for the surge suppression application. FIGS. 1-3 illustrate a preferred embodiment wherein a three phase line is employed having Phase A, Phase B, Phase C, Neutral and Ground.

Each MOV V1-V20 has it's own thermal fuse VF1-VF20, respectively, coupled in series with its MOV (herein jointly numbered 28). In the preferred embodiment, thermal fuses VF1-VF20 are enclosed within the component body of each MOV V1-V20, respectively. A set of three LEDs, LED1-3, one for each phase of the three phase line, are employed for indicating that a failure may have occurred with any one of the three columns of MOVs associated with a given phase of the three phase line. A set of three resistors, R1, R2 and R3, are also employed in series with LED1, LED2 and LED3, respectively.

With continuing reference to FIG. 1, it is shown that three surge rated fuses, F1, F2 and F3, (collectively individually numbered 30) are employed wherein one fuse is provided for each phase of the three phase line. As shown, fuses F1, F2 and F3 are all coupled directly to the power terminals of the three phase electrical line and are also coupled directly, in very close proximity, to the array of MOVs. This provides for a very short lead length for fuses F1, F2 and F3. In the preferred embodiment, ferrule type surge rated fuses are employed, rated for 5-100 kA 8×20 uSec Waveforms, 600 VAC, 200 kA I.R. These fuses permit the TVSS device to withstand a rated surge pulse without opening, but are current limiting under AC short circuit conditions. Nothing herein limits this invention from using higher or lower rated fuses to accomplish the same result for a different application for TVSS technology.

The mounting of fuses F1, F2 and F3 (number 30 in FIGS. 3 and 5) on the same printed circuit board as the array of MOVs and their associated thermal fuses permit the TVSS device of the present invention to employ only one circuit board 18, which in turn permits a small housing to be used.

Referring to FIG. 2, a housing 12 is shown which encloses circuit 10. Housing 12, is made from a high fire retardant material to inhibit the spreading of a fire in the unlikely event of a melt down of the MOVs on circuit 10. Housing 12 includes a cover 14, on which are mounted the three LEDs, Led1, LED2 and LED3. Cover 14 is held in place by a set of screws 16 at each corner of cover 14.

Referring to FIG. 3, an exploded view of housing 12 is shown. As illustrated, circuit 10 is enclosed within housing 12 and mounted upon a single printed circuit board (PCB) 18. Each phase of a three phase line, Phase A, Phase B and Phase C, along with Neutral and Ground, couple to PCB 18 and has wire leads 34 and Neutral and Ground extending therefrom through an aperture 20 in housing 12.

Figure 4:
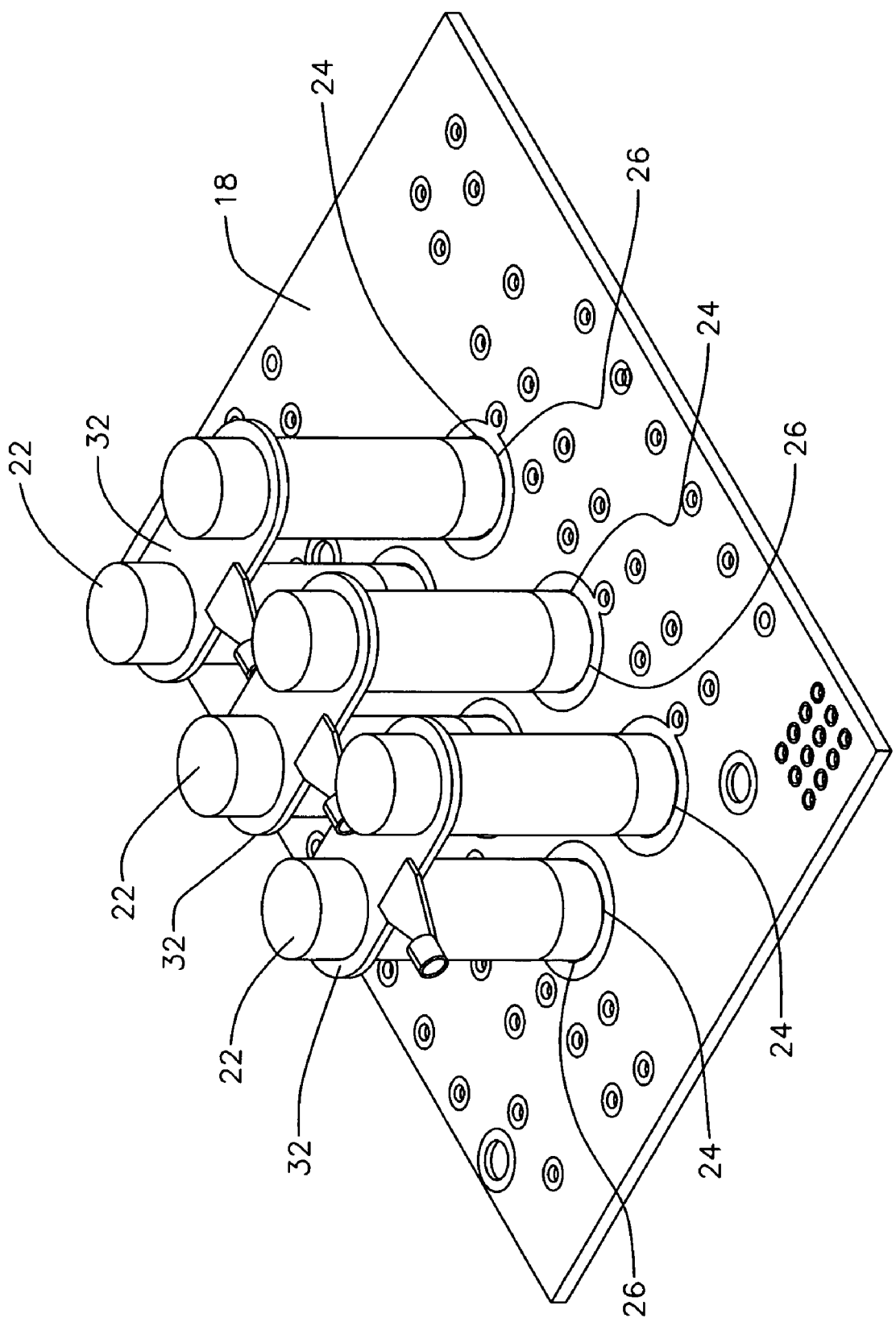
FIG. 4 is a perspective view of three pair of fuses soldered to a circuit board.

Referring to FIG. 4, pairs of ferrule type fuses 22 are soldered 24 to suitable size bores 26 in circuit board 18. Rows of varistors 28 (not shown in this FIG. 4) are mounted in each side of the fuses 22. A ring terminal 32 electrically connects the pair of ferrule type fuses 22. The ring terminal 32 can be a standard, flag or dual ring terminal as needed. Electrical conductors 34 connect the fuse to the electrical circuit to be protected such as phase A, B or C shown in FIGS. 1-3.

Figure 5:
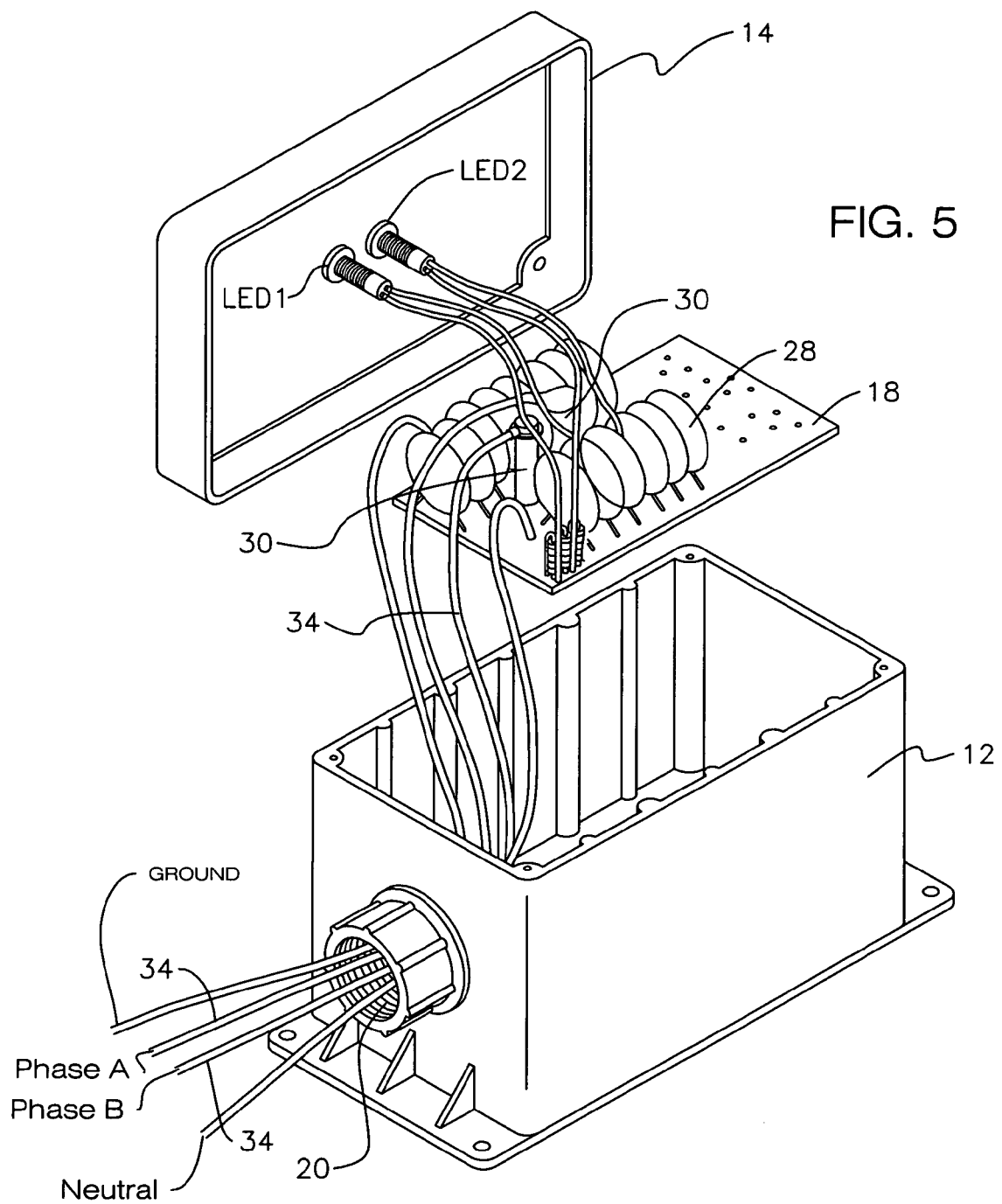
FIG. 5 is an exploded view of the housing enclosing the novel TVSS device circuit employing two fuses.

Referring to FIG. 5 as few as two fuses 30 are positioned between varistors 28. These fuses can be used for separate phases A and B or can be combined with a ring terminal 32 to protect a single circuit.

Another embodiment of the fusing system includes the connection of the ferrule fuse between two circuit boards with appropriately sized bores through them. The fuse or multiple fuses can be placed in between these boards and soldered into place. This will allow for the connection of multiple fuses from and to multiple phases, modes or suppression components. The fuses will be soldered into place on both of the boards.

Additional diagnostic circuits or features can be employed with the device of the present invention.

Equivalent elements can be substituted for the ones set forth above such that they perform the same function in the same way for achieving the same result.

Having thus described the invention what is claimed and desired to be secured by Letters Patent is:

1. An apparatus for protecting an electrical circuit from thermal and line level over-current conditions, the apparatus comprising;
    a) a stand alone housing having an enclosed interior with an open top enclosed by a cover;
    b) a printed circuit board mounted within the housing, the circuit board having multiple through bores of varying diameters for receipt of electrical components and for providing electrical connectivity to the electrical components at said bores to the printed circuit board and thereby forming a printed circuit assembly of the apparatus;
    c) a first and second row of metal oxide varistors soldered to the circuit board in bores of suitable diameter, each metal oxide varistor having an internal thermal component;
    d) at least one surge rated ferrule type fuse having an outer metal electrically conductive surface of the fuse soldered directly to the circuit board as an integral and non-removable component of the printed circuit board in a bore of suitable diameter formed in the circuit board as part of the printed circuit assembly between the first and second row of varistors such that no tubular fuse assemblies, insulating bodies, or fuse clips are employed to attach the at least one fuse to the printed circuit board; and
    e) an electrical conductive wire connecting the surge rated ferrule type fuse, and thus the entire suppression circuit to the electrical circuit to be protected.

2. The apparatus for protecting an electrical circuit according to claim 1, wherein three surge rated ferrule type fuses are employed between the varistors.

3. The apparatus for protecting an electrical circuit according to claim 1, wherein three pairs of the fuses are each connected by a ring terminal.

4. The apparatus for protecting an electrical circuit according to claim 1, wherein two surge rated ferrule type fuses electrically connected by a ring terminal are electrically connected to the electrical circuit to be protected.

5. The apparatus for protecting an electrical circuit according to claim 1, wherein an additional row of metal oxide varistors is soldered to the circuit board.

6. The apparatus for protecting an electrical circuit according to claim 1, wherein the housing cover contains multiple openings for mounting an LED in each opening, the LED indicating normal electrical operation when lighted.

7. A method of protecting an electrical circuit from thermal and line level overcurrent conditions, the method comprising:
    a) providing a stand alone housing having an enclosed interior with an open top enclosed by a cover;
    b) mounting a printed circuit board within the housing, the printing circuit board having multiple through bores of varying diameters for providing electrical connectivity to the electrical components at said bores to the printed circuit board and thereby forming a printed circuit assembly of the apparatus;

c) soldering a first and second row of metal oxide varistors to suitable bores in the circuit board, each metal oxide varistor having an internal thermal component;

d) soldering at least two surge rated ferrule type fuses directly to suitable bores in the circuit board between the first and second row of metal oxide varistors, such that the at least two surge rated ferrule type fuses are integral and nonremovable components of said circuit board and the printed circuit assembly, and wherein no tubular fuse assemblies, insulating bodies or fuse clips are employed for attaching the at least two fuses thereto; and e) attaching an electrically conductive wire to each surge rated ferrule type fuse by passing the wire through an opening in the housing and connecting it to the electrical circuit to be protected.

8. The method of protecting an electrical circuit according to claim 7, wherein three surge rated ferrule type fuses are soldered to the circuit board between the rows of metal oxide varistors.

9. The method of protecting an electrical circuit according to claim 7, wherein a ring terminal is connected to two surge rated ferrule type fuses and a single conductor is attached to the ring terminal at one end and to the circuit to be protected at the other end.

10. The method of protecting an electrical circuit according to claim 7, wherein an additional row of metal oxide varistors is soldered to the circuit board.

11. The method of protecting an electrical circuit according to claim 7, wherein the housing cover is provided with multiple openings and a light emitting diode is mounted in each opening and the light emitting diodes are connected electrically to the electrical system in the circuit board.

12. The method of protecting an electrical circuit according to claim 7, wherein three pairs of surge rated ferrule type fuses are soldered to the circuit board between the rows of metal oxide varistors and each pair of the fuses is connected together with a ring terminal.

13. A system for protecting an electrical circuit from thermal and line level over-current conditions, the system comprising;

a) a printed circuit board mounted within a stand alone housing, the printed circuit board having multiple through bores for receipt of soldered electrical components thereby providing electrical connectivity to the electrical components at said bores to the printed circuit board and thereby forming a printed circuit assembly of the apparatus;

b) a first and second row of metal oxide varistors soldered in appropriate circuit board bores, each metal oxide varistor having an internal thermal component;

c) at least two surge rated ferrule type fuses soldered directly to an appropriate circuit board bore adjacent each other and juxtaposed between the first and second row of metal oxide varistors, such that the at least two surge rated ferrule type fuses are integral and nonremovable components of the circuit board and wherein no tubular fuse assemblies, insulating bodies or fuse clips are employed to attach the at least two fuses to the printed circuit board; and d) an electrically conductive wire connecting the surge rated ferrule type fuse to a circuit to be protected.

14. The system for protecting an electrical circuit according to claim 13, wherein a pair of surge rated ferrule type fuses are connected by a ring terminal and an electrical conductor connects the ring terminal to the circuit to be protected.

15. The system for protecting an electrical circuit according to claim 13, wherein an additional row of metal oxide varistors is soldered to the circuit board.

16. The system for protecting an electrical circuit according to claim 13, wherein the housing has a through hole for exit of the electrical conductor and through holes for mounting light emitting diodes in each hole.

* * * * *